UNITED STATES PATENT OFFICE.

ARTHUR NIXON, OF MANCHESTER, ENGLAND.

INDIA-RUBBER COMPOSITION.

1,384,400. Specification of Letters Patent. Patented July 12, 1921.

No Drawing. Application filed April 19, 1920. Serial No. 375,130.

*To all whom it may concern:*

Be it known that I, ARTHUR NIXON, a subject of the King of Great Britain and Ireland, and a resident of Manchester, in the county of Lancaster, England, have invented certain new and useful Improvements in India-Rubber Compositions, for which I have filed an application in Great Britain filed Jan. 22, 1919, of which the following is a specification.

This invention relates to india-rubber compositions, and has for its object to provide an improved composition applicable for a large number of purposes, among which may be instanced soles and heels for boots, shoes and slippers, insulating purposes, packing rings and washers and other electrical and mechanical purposes.

The new or improved composition is obtained by incorporating with caoutchouc or caoutchouc-like substances, so-called "vulcanized fiber" in a ground, shredded or other appropriate reduced state, such as in granular or sawdust-like form. If desired, other appropriate ingredients may also be incorporated.

A composition very suitable for a great variety of purposes may be obtained by incorporating 10 parts of india-rubber and 20 parts of ground or fine granular vulcanized fiber.

In preparing the composition, the india-rubber and vulcanized fiber, together with, of course, the necessary quantity of sulfur for vulcanization, may be thoroughly mixed together by kneading or otherwise suitable, into a plastic mass or dough, throughout which the vulcanized fiber is uniformly distributed. The plastic mass or dough may then be rolled into sheets, or be otherwise shaped as required, and vulcanized.

What I claim as my invention, and desire to secure by Letters Patent is:—

1. The improved composition comprising a vulcanized mixture of a caoutchouc-like substance and vulcanized fiber.

2. The improved composition comprising a vulcanized mixture of a caoutchouc-like substance and small particles of vulcanized fiber.

3. The improved composition comprising a vulcanized mixture of approximately 10 parts of a caoutchouc-like substance and approximately 20 parts of finely divided vulcanized fiber.

In witness whereof I have hereunto set my hand.

ARTHUR NIXON.